June 6, 1939.  D. B. MEARS  2,161,370
SPINAL DETECTOR
Filed May 21, 1936  2 Sheets-Sheet 1

Inventor
D. B. Mears
By Clarence A. O'Brien and
Hyman Berman
Attorneys

June 6, 1939.   D. B. MEARS   2,161,370
SPINAL DETECTOR
Filed May 21, 1936   2 Sheets—Sheet 2

Inventor
D. B. Mears
By Clarence A. O'Brien and Hyman Berman
Attorneys

Patented June 6, 1939

2,161,370

UNITED STATES PATENT OFFICE 2,161,370

SPINAL DETECTOR

Donald B. Mears, St. Albans, Vt.

Application May 21, 1936, Serial No. 81,077

3 Claims. (Cl. 128—2.1)

This invention appertains to new and useful improvements in means for analyzing spinal conditions. More particularly the invention relates to an apparatus which will permit comparing the simultaneous temperatures of separated areas along the spine.

One of the principal objects of the invention is to detect inflammation or other conditions which cause local increases in temperature, through the detetction of the local differences in temperature so set up and the location of the point so heated.

Other important objects and advantages of the invention will become apparent to the reader of the following specification.

Figure 4:
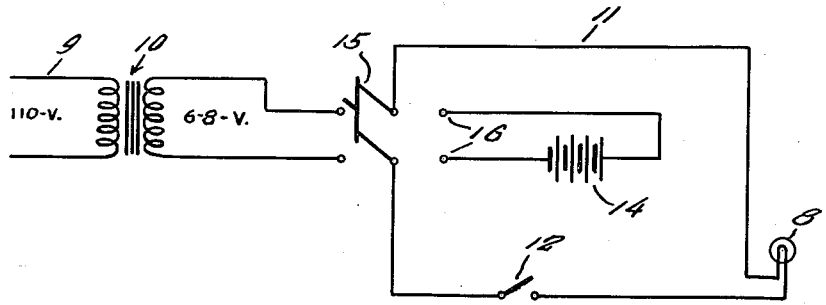
Figure 4 is a diagrammatic view of the instrument lighting means.

Referring to the drawings wherein like numerals designate like parts, it can be seen that the instrument includes the galvanometer gauge 5 which is visible through the window 6 at the front of the box 7. This instrument is of the type employing a lamp 8 which through the use of a mirror (not shown) casts a beam of light onto the dial 5. The wiring for the lamp 8 is shown in Figure 4 wherein the numeral 9 represents the 110 volt supply connected up with the step-down transformer 10. The secondary of the transformer 10 is in the circuit 11 with the lamp 8 and the switch 12. The commercial current supply line may be plugged into the socket 13 on the front of the box 7, or else this supply may be dispensed with and a battery or batteries 14 substituted in which instance the switch 15 would be thrown from the commercial line connecting position to engage the contacts 16 for utilizing the battery 14. The battery is desirable when the apparatus is to be carried from point to point as a portable assembly.

Figure 5:
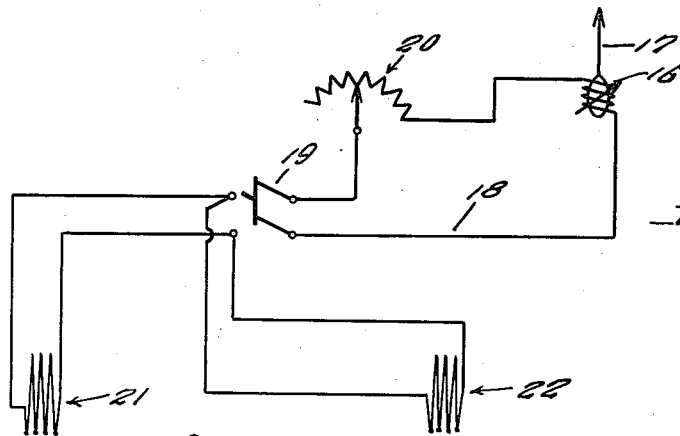
Figure 5 is a diagrammatic view of the wiring connections of the thermocouple and indicator circuit.
Figure 6:
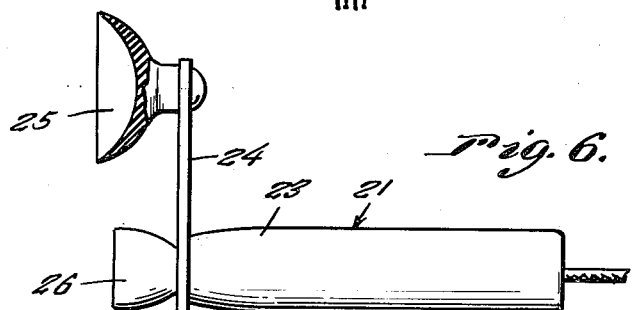
Figure 6 is a top plan view, partly in section of the fixed thermocouple unit.

Figure 5 discloses diagrammatically the electrical connections between the elements of the indicating system. The numeral 16 represents the coil of the indicator 17 in the circuit 18 with the switch 19 and rheostat 20. This switch 19 is employable for connecting up the thermocouples 21—22 in multiple with the indicating means.

The fixed thermocouple consists of the shell 23 attached to the cross member 24 at the ends of which are located vacuum cups 25—25, that is, one at each side of the contact head 26. This is the fixed type of thermocouple which is employed in conjunction with the movable thermocouple 22.

Figure 1:
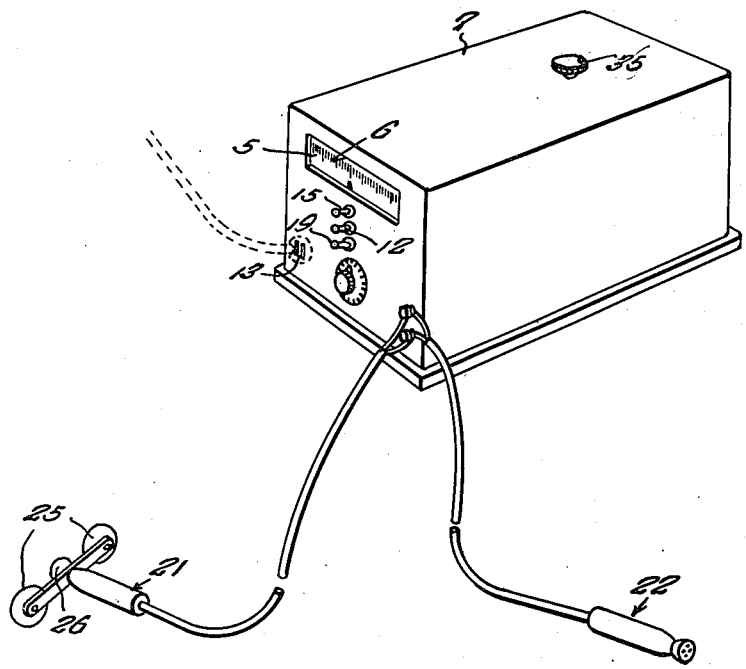
Figure 1 represents a perspective view of the apparatus.
Figure 2:
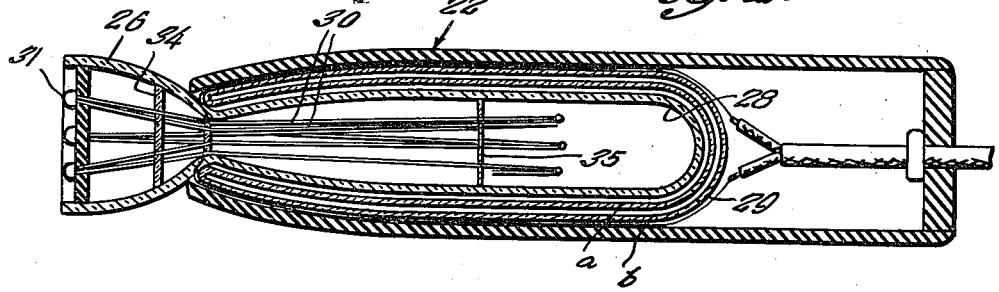
Figure 2 represents a longitudinal sectional view of the thermocouple.
Figure 3:
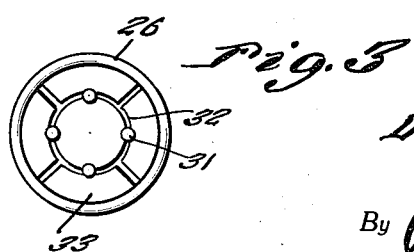
Figure 3 is an end elevational view of the thermocouple.

These thermocouples are of identical construction, each consisting of the aforementioned insulation shell 23 and the contact head 26. This contact head 26 merges with the elongated bulb 28 and it is preferable that this bulb 28 and its head 26 be of glass or some other suitable material. A glass container 29 is disposed around the bulb 28 and has the spaced walls a—b, the space between the same being evacuated. The space between this container 29 for the bulb 28 and the bulb 28 is a dead-air space, the open end of the container 29 abutting the head 26 as shown in Figure 2.

The wires 30 of the thermocouple 21 extends longitudinally in the bulb 28 and connects with the contacts 31 which are located in slots 32 in the partition or closure wall 33 of insulation, located in the head 26. These wires 30 are trained through openings in other partitions 34—35. The wire contacts 31 may be of nickel and copper or some other suitable materials.

In the use of the movable thermocouple 22, it is to be understood that the same is placed on the spine and moved over the area of nerve locations by the operator. The fixed unit is held to the patient's back by rubber suction cups 25 which create a suction and hold the thermocouple 21 in contact with the body. By placing fixed unit, the movable unit can then be used to registering difference in temperatures that exist above normal body temperature, such as arise from irritated nerves. The excess nerve heat is indicated by a quick movement of the light beam as the detector passes over the affected nerve, mounting to from 1 to 25 one hundredths of one degree Fahrenheit on the galvanometer.

Two units 21—22 are employed, for if only one alone were used, the electric current produced by placing only one on the spine would be so great that the beam of light would pass out of the graduated area of the galvanometer. Under normal conditions, the fixed unit will balance the movable unit to a degree sufficient to keep the beam of light in the graduated area.

The rheostat 20 is employed to bring the beam of light back into the visual area, by reducing the sensitivity of galvanometer, for at times the normal temperatures of the body vary enough to cause the light beam to pass out of the graduated area. The knob 35 on the top of the box 7 is connected with the galvanometer unit, and when it is turned to the right or left, the usual mirror attached to the unit naturally throws the beam of light either to the right or to the left; thus further balancing the two units.

Another important advantage is: by using one fixed unit in balance with a movable unit, it is possible to determine the heat of an individual nerve. Formerly, devices of this character employed two movable units, a process which results in the recording of the temperature differences between two movable points. Obviously the device can be used in various other fields besides that stated herein.

The dead air space between the container 27 and the bulb 28 insulates the heat of the operator's hand from the elements of the thermocouple 22.

While the foregoing specification set forth the invention in specific terms, it is to be understood that numerous changes in the shape, size and materials may be resorted to without departing from the spirit and scope of the invention as claimed hereinafter.

Having described the invention what is claimed as new is:

1. In an analyzing apparatus of the character described a fixed thermocouple unit having a contact end, a cross member through which the contact end extends, and suction cups on the said cross member.

2. In an analyzing apparatus of the character described a fixed thermocouple unit and a movable thermocouple unit operatively connected, said thermocouples each consisting of a case of insulation, an elongated bulb in the casing, said bulb being provided with a flared head portion extending beyond the casing and having a frame mounted therein, contact elements exposed on the said frame, said bulb being adapted to contain the electrical elements of the thermocouple, and a container for the said bulb, said container being of double-wall construction and evacuated.

3. In an analyzing apparatus of the character described a fixed thermocouple unit and a movable thermocouple unit operatively connected, said thermocouples each consisting of a case of insulation, an elongated bulb in the casing, said bulb being provided with a flared head portion extending beyond the casing and having a frame mounted therein, contact elements exposed on the said frame, said bulb being adapted to contain the electrical elements of the thermocouple, and a container for the said bulb, said container being of double-wall construction and evacuated, said container being spaced from the bulb to provide a dead-air space.

DONALD B. MEARS.